Sept. 30, 1958  W. H. SPENCER ET AL  2,853,746
INSULATION MOUNTING
Filed Nov. 30, 1953
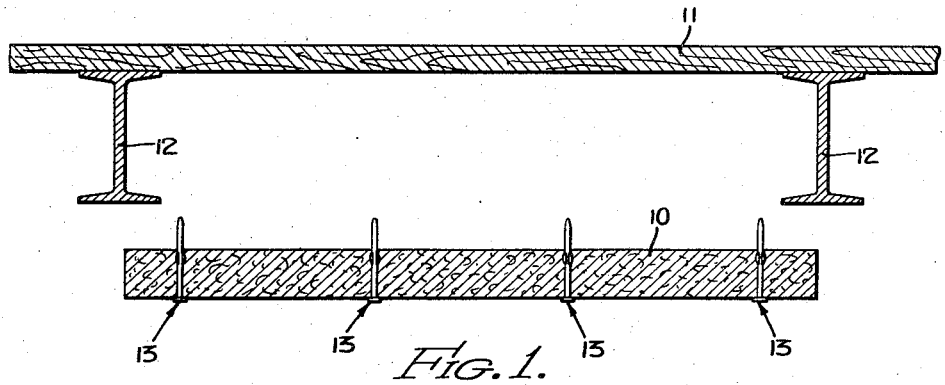
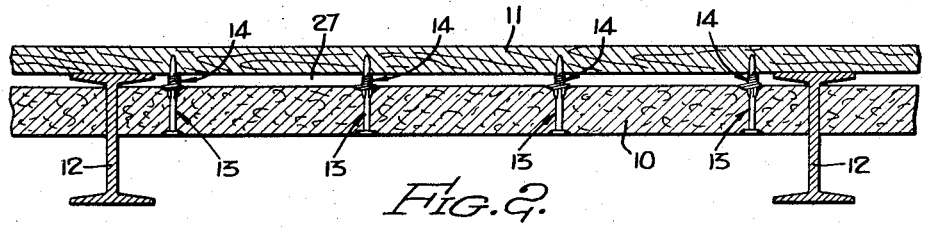
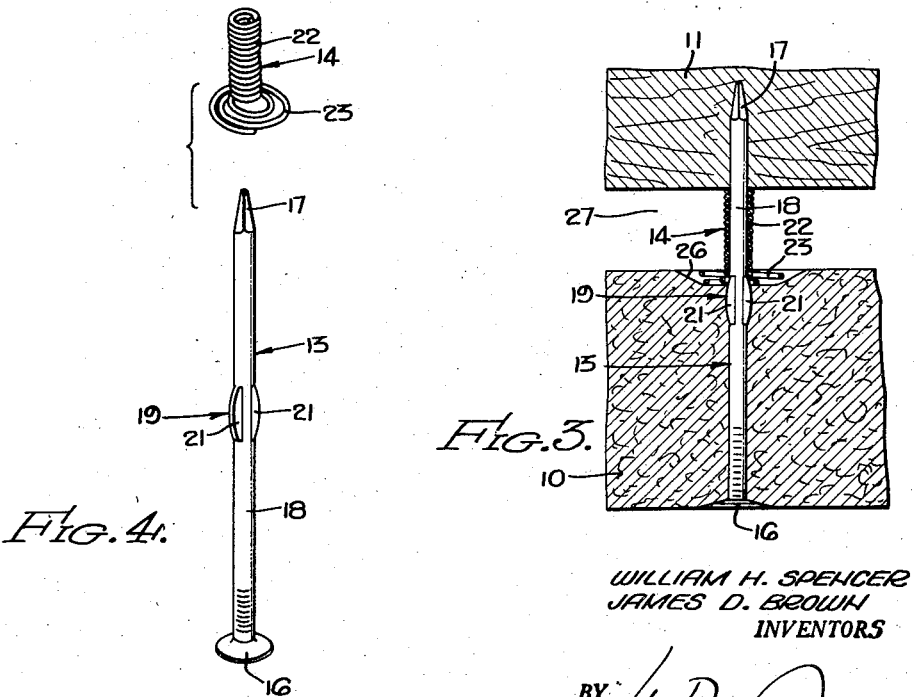
WILLIAM H. SPENCER
JAMES D. BROWN
INVENTORS
BY *ATTORNEY* official_header_omitted

2,853,746

INSULATION MOUNTING

William H. Spencer, La Canada, and James D. Brown, Los Angeles, Calif., assignors to Ultra-Tach Co., Los Angeles, Calif., a copartnership Application November 30, 1953, Serial No. 395,129

6 Claims. (Cl. 20—4)

This invention relates to an insulation mounting, and particularly to an improved nail assembly for mounting insulation board in predetermined spaced relationship from a wall or ceiling member.

In our co-pending application Serial No. 367,932, filed July 14, 1953, for an Insulation Mounting, now abandoned, there was described in connection with Figures 5 and 6, a nail means for mounting insulation material in spaced relationship from a supporting element such as a roof board. The structure there described comprised a nail having a raised arrow-like portion intermediate its head and point and adapted to abut both the supporting board and the insulation board to space them the desired distance from each other. In using the nail, the arrow-like portion was first driven through the insulation with resultant formation of a relatively wide hole or gap. This wide hole or gap would, particularly when formed in certain types of relatively soft insulation board, permit the insulation to be shifted into excessively close adjacency with the supporting board, making the air space inadequate for its desired purpose of increasing the heat and sound insulation effect and of providing room for wires and conduits. Additionally, it has been discovered that the formation of the arrow-like portions resulted in substantial weakening of the nail, which would tend to bend at that point in the event of inexpert hammering.

In view of the above factors characteristic of the field of unitary nail elements for mounting insulation, it is an object of the present invention to provide a nail assembly comprising two separate components one of which is driven through the insulation and into the supporting board and the other of which is mounted on the one component after its driving through the insulation and before its entrance into the supporting board.

Another object of the invention is to provide a nail having only a slightly raised portion to act as a stop for a separate spacer element, so that no relatively wide hole or gap is formed in the insulation through which the nail is driven.

Another object of the invention is to provide a novel spring-like spacer element adapted to cooperate with a slightly raised portion on the shank of a nail, the raised portion being such that the nail is not materially weakened.

These and other objects and advantages of the invention will be more fully set forth in the following specification and claims considered in connection with the attached drawing to which they relate.

In the drawing:

Figure 1 is a sectional view illustrating an insulation board having a plurality of nails inserted therethrough prior to its mounting on a supporting board;

Figure 2 is a view corresponding to Figure 1 but showing the nails after driving into the supporting board and with spacer elements mounted thereon, the spacer elements effecting creation of the desired air space between the supporting board and insulation board;

Figure 3 is an enlarged detail view of one of the nail assemblies as illustrated in Figure 2; and Figure 4 is an enlarged exploded perspective view of a nail and spacer element.

Referring to the drawing, the invention is illustrated as employed in mounting an insulation board 10, preferably formed of relatively soft, fibrous material, on a supporting board element 11 formed of wood or other material into which nails may be driven. One or more elements 11 may form a building wall supported by vertical studs 12, or may comprise a ceiling or roof structure in which event the elements 12 are purlins instead of studs. Studs or purlins 12 are shown as of I section and are spaced a sufficient distance apart to receive insulation boards between them.

According to the invention, the means for mounting the insulation 10 to support board 11 comprises a plurality of nail assemblies each of which consists of a nail 13 and a spacer 14 adapted to be mounted thereover. Nail 13 comprises a head 16, a point 17, a shank 18 and a stop portion 19 formed on the shank intermediate the head and point. It is a feature of the invention that the stop portion 19 comprises raised beads or ridges 21 extending parallel to the shank 18 and protruding only slightly above its surface. The formation of the beads or ridges 21 does not substantially weaken the shank, nor is a large hole formed in the insulation 10 when the nail is driven through it.

The spacer 14 comprises a continuous spring wire formed as a tightly wound helical body 22 having an outwardly spiraling volute portion 23 at one end, the latter constituting, in effect, a flange at the end of the helical body portion. The internal diameter of the helix is such that the nail shank 18 will penetrate it but will be frictionally gripped in order to prevent displacement of the spacer due to vibration, for example created by hammering action against another nail assembly. Since the helical body portion is of substantially the same internal diameter as the outer diameter of shank 18, it may not be moved over the stop portion 19 the beads or ridges 21 of which are raised slightly above the shank surface as previously indicated.

The spacing between the nail head 16 and the remote end of stop portion 19 is caused to be slightly less than the thickness of the insulation board 10. It follows that when the nail 13, spacer 14, and the insulation and mounting boards are assembled as best illustrated in Figure 3, the nail head 16 will be countersunk into the insulation board and a recess 26 will be formed by volute spacer portion 23 as described below.

In using the nail assemblies of the invention, a plurality of nails 13 are first driven through the insulation board 10 and at spaced centers, as illustrated in Figure 1, without forming in the insulation board holes of greater size than the nail shanks plus the slightly raised beads or ridges 21. A corresponding number of spacers 14 are then mounted over the nail ends and with their volute portions 23 relatively adjacent the nail heads 16. Referring to Figures 2 and 3, the nails 13 are then hammered until the ends of the helical portions 22 on stop portions 19 seat and abut against the surface of board 11, a space 27 then being formed between the insulation and support boards to increase the insulation action and to provide room for conduits and wires. Because of the predetermined spacing between stop portions 19 and heads 16, the hammering action results in countersinking of the heads 16 and a slight penetration of the volute portions 23 into the soft insulation board surface to form the recesses 26 prior to seating of the spacers against the nail stop portions 19.

The described nail assembly may thus be seen to result in formation of a space 27 of predetermined uniform width. The insulation board 10 may not be shifted outwardly since the nail heads 16 prevent such an action, and may not be shifted inwardly since the volute portions 23 of the spacers 14 act as resilient stops to prevent such an action even with insulation comprising soft fibrous material. No large hole is formed in the insulation board, and there is no possibility that the board may be shifted in either outer or inner directions.

While the particular device herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. In combination, a board member into which nails may be driven, a body of insulation extended parallel and adjacent thereto, support elements for said board member and extended along opposite sides of said insulation, and means to support said insulation between said support elements and in spaced relation to said board member, said means comprising a plurality of nail-like elements extended through said insulation and into said board member and having slightly enlarged stop portions positioned between their ends and adjacent the inner surface of said insulation, and a corresponding number of spacers mounted one on each of said nail-like elements and in contact with said enlarged stop portions and with the adjacent surface of said board member.

2. An insulation mounting assembly; comprising a shank having a head at one end, a point at the other end, and a stop portion intermediate the head and point and spaced from both; and a spacer mounted over the pointed end of said shank and in stopping contact with the end of said stop portion nearest said point, said spacer comprising a tightly wound helical spring element having an outwardly spiraling volute portion at its end adjacent said stop portion, said volute portion being adapted to abut an insulation surface to space the latter from said pointed end.

3. The invention as claimed in claim 2, in which said tightly wound helical spring element has an inner diameter slightly less than the diameter of said shank, whereby said spring element frictionally grips said shank to prevent said elements from separating prior to insertion of said pointed end into a board or the like.

4. In combination, a board member into which nails may be driven, a body of insulation extended parallel and adjacent thereto, and means to support said insulation in spaced relation to said board member, said means comprising a plurality of nail-like elements extended through said insulation and into said board member and having slightly enlarged stop portions positioned between their ends and adjacent the inner surface of said insulation, and a corresponding number of spacers mounted one on each of said nail-like elements and in contact with said enlarged stop portions and with the adjacent surface of said board member.

5. A nail type fastening assembly adapted for use in securing panels of building material to a building structure and in spaced relation thereto, said assembly comprising a headed nail having a pointed end, the shank of said nail having integral stop means protruding therefrom intermediate the ends thereof, said stop means being spaced from said nail head a distance less than the thickness of the panels with which said assembly is adapted to be used, and wire coil means adapted to having a frictional fit over the pointed end of said fastener with one end engageable with said stop means when the head of the nail is fully driven into said panel with its pointed end embedded in the building structure, the length of said wire coil being effective in cooperation with said stop means to determine the spacing of the panel from the supporting structure therefor.

6. A fastening assembly as defined in claim 5 characterized in that the end of said wire coil adjacent said stop means includes a generally flat volute portion adapted to have wide area surface contact with the panel in the erected position of the panel and fastener assembly.

References Cited in the file of this patent

UNITED STATES PATENTS

| 1,108,209 | Mitchell et al. | Aug. 25, 1914 |
| 1,557,711 | Leonard | Oct. 20, 1925 |
| 1,561,518 | Graham | Nov. 17, 1925 |
| 1,656,333 | Lund | Jan. 17, 1928 |
| 1,701,095 | Benedict | Feb. 5, 1929 |
| 2,138,919 | Herman | Dec. 6, 1938 |
| 2,201,930 | Stark | May 21, 1940 |
| 2,239,109 | Lundvall | Apr. 22, 1941 |

OTHER REFERENCES

American Roofer, August 1948.
The Architectural Forum, May 1943, page 190.